(12) United States Patent
Glanville et al.

(10) Patent No.: US 9,195,460 B1
(45) Date of Patent: Nov. 24, 2015

(54) USING CONDITION CODES IN THE PRESENCE OF NON-NUMERIC VALUES

(75) Inventors: Robert Steven Glanville, Cupertino, CA (US); John Erik Lindholm, Saratoga, CA (US); Ming Y. Siu, Santa Clara, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 1830 days.

(21) Appl. No.: 11/415,781

(22) Filed: May 2, 2006

(51) Int. Cl.
*G06F 9/45* (2006.01)
*G06F 9/30* (2006.01)

(52) U.S. Cl.
CPC .................................. *G06F 9/30094* (2013.01)

(58) Field of Classification Search
USPC .............. 717/136, 140; 712/220–222, 14, 24, 712/208, 234, 244; 708/495–498, 505, 551, 708/506; 714/25; 711/173; 345/623
IPC ............ G06F 9/30007,9/30021, 7/483, 9/30094
See application file for complete search history.

(56) References Cited

U.S. PATENT DOCUMENTS

| | | | | |
|---|---|---|---|---|
| 5,193,157 A | * | 3/1993 | Barbour et al. ................ | 712/234 |
| 6,789,098 B1 | * | 9/2004 | Dijkstra .......................... | 708/495 |
| 7,117,342 B2 | * | 10/2006 | Tremblay et al. .............. | 712/208 |
| 7,242,414 B1 | * | 7/2007 | Thekkath et al. .............. | 345/623 |
| 2003/0005013 A1 | * | 1/2003 | Steele, Jr. ...................... | 708/495 |
| 2003/0115577 A1 | * | 6/2003 | Garvey ........................... | 717/136 |

OTHER PUBLICATIONS

Gosling et al, "Java Language Specifications, Third edition", JVM Specifications, chp. 4, 15, May 2005 <javaspec-3_ch4&15.pdf>.*
Gosling et al, "Java Language Specifications, Third edition", JVM Specifications, chp. 14, May 2005, 50 pg <Gosling_chp14.pdf>.*
Eggers, et al. "Simultaneous Multithreading: A Platform for Next-Generation Processors," *IEEE Micro*, vol. 17, No. 5, pp. 12-19, Sep.-Oct. 1997.

* cited by examiner

*Primary Examiner* — Tuan Vu
(74) *Attorney, Agent, or Firm* — Artegis Law Group, LLP

(57) ABSTRACT

Systems and methods for compiling programs using condition codes and executing those programs when non-numeric values are present allow for explicit handling of non-numeric values. In addition to the conventional condition code values of positive, negative, and zero, a fourth value may be encoded, not a number (NaN) representing a non-numeric value. New condition tests are defined that explicitly account for condition code values of NaN. A compiler may produce code using the new condition tests to represent if and if-else statements. The code including the new condition tests generates deterministic results during execution when non-numeric values are present.

18 Claims, 7 Drawing Sheets

USING CONDITION CODES IN THE PRESENCE OF NON-NUMERIC VALUES

BACKGROUND OF THE INVENTION

1. Field of the Invention

Embodiments of the present invention generally relate to condition codes for and, more specifically, to the use and evaluation of condition tests for non-numeric values.

2. Description of the Related Art

Conventionally condition codes are used in computer programs to store the result of numeric comparisons for later use in determining control flow, in particular to determine which additional computations to perform. Two bits are used to represent three condition codes values indicating whether the comparison output value is positive, zero, or negative. Eight condition tests may be evaluated for a condition code value to produce a true or false result. Six of the eight condition tests are less than (LT), equal (EQ), greater than (GT), less than or equal (LE), greater than or equal (GE), and not equal (NE) representing all relationships between a condition code value and zero. The other two condition tests are always (TR) and never (FL).

The IEEE (Institute of Electronics and Electrical Engineers) has defined a particular format for representing floating point numbers with non-numeric values, not a number (NaN). A NaN does not have an order relative to numeric values, and therefore, can yield unexpected results when used to produce a condition code value or as the input for a condition test. Seven of the eight condition tests evaluate to FALSE when a NaN is present, and the remaining test, the TR test evaluates to TRUE. Because of this, the negation of an ordered test does not result in a negated result when a NaN is present, i.e., GT and LE both evaluate to FALSE.

When an "if" statement is compiled the program code used to represent the "if" statement may use condition codes and a negated condition test. For example, the "if" statement "if A>B, then x=0" may be represented by the code sequence shown in TABLE 1.

TABLE 1

```
COMP cc, A, B
BRANCH cc.LE, DONE
X = 0
DONE:
```

COMP sets the condition code, cc to the result of a comparison between A and B. Specifically when A is greater than B cc=positive, when A is equal to B cc=zero, and when A is less than B cc=negative. It is possible to use an addition or a subtraction operation to produce the condition code. Rather than using the GT test, the LE test is used to "jump over" the x=0 code that should be executed when A>B is true.

Unfortunately, when either A or B is a NaN, the condition code value cannot be reliably determined since different processors may produce different condition code values for a NaN. Therefore, x=0 may be executed when either A or B is a NaN even though the desired result is execute x=0 only when A>B.

Accordingly, there is a desire to use condition codes when non-numeric values may be present and produce deterministic results.

SUMMARY OF THE INVENTION

The current invention involves new systems and methods for compiling programs using condition code value and condition tests and executing those programs when non-numeric (NaN) values are present. In addition to the conventional condition code values a fourth value may be encoded, representing a NaN. New condition tests are defined that explicitly account for NaN values. A compiler may generate code using the new condition tests to represent if and if-else statements. The code including the new condition tests will produce deterministic results during execution when NaN values are present.

Various embodiments of a method of the invention for generating a sequence of commands for explicit handling of non-numeric values include detecting an if statement including an if condition test and if code for execution when the if condition test is true, inserting a first comparison operation command to produce a condition code value in the sequence of commands, selecting a condition test from a set of condition tests based on the if condition test, wherein the set of condition tests includes condition tests that explicitly handle non-numeric values, and inserting a second command including the condition test and the condition code value.

Various embodiments of a method of the invention for executing commands when non-numeric values are present include receiving a command including a condition test and a condition code value, wherein the condition code value is one of positive, negative, zero and not a number (NaN), determining that the condition test specifies a true or false result when the condition code value is NaN, and evaluating the condition test based on the condition code value to produce the true or false result.

Various embodiments of the invention include an instruction processing unit for processing commands with explicit handling of non-numeric values. The instruction processing unit is configured to compute a condition code value that is one of positive, negative, zero, and not a number (NaN) and evaluate a condition test based on the condition code value to produce a true or false result.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves encoding a fourth value in addition to the conventional condition code values. The fourth value represents an unordered output value when one or both of the inputs to a comparison is a non-numeric value. New condition tests are defined that explicitly account for non-numeric values. A compiler may generate code using the new condition tests to represent if and if-else statements. The code including the new condition tests will generate deterministic results during execution when non-numeric values are present. In contrast, when the conventional condition tests are applied to condition codes values in the presence of non-numeric values, the output result may vary, producing undesired effects.

Figure 1A:
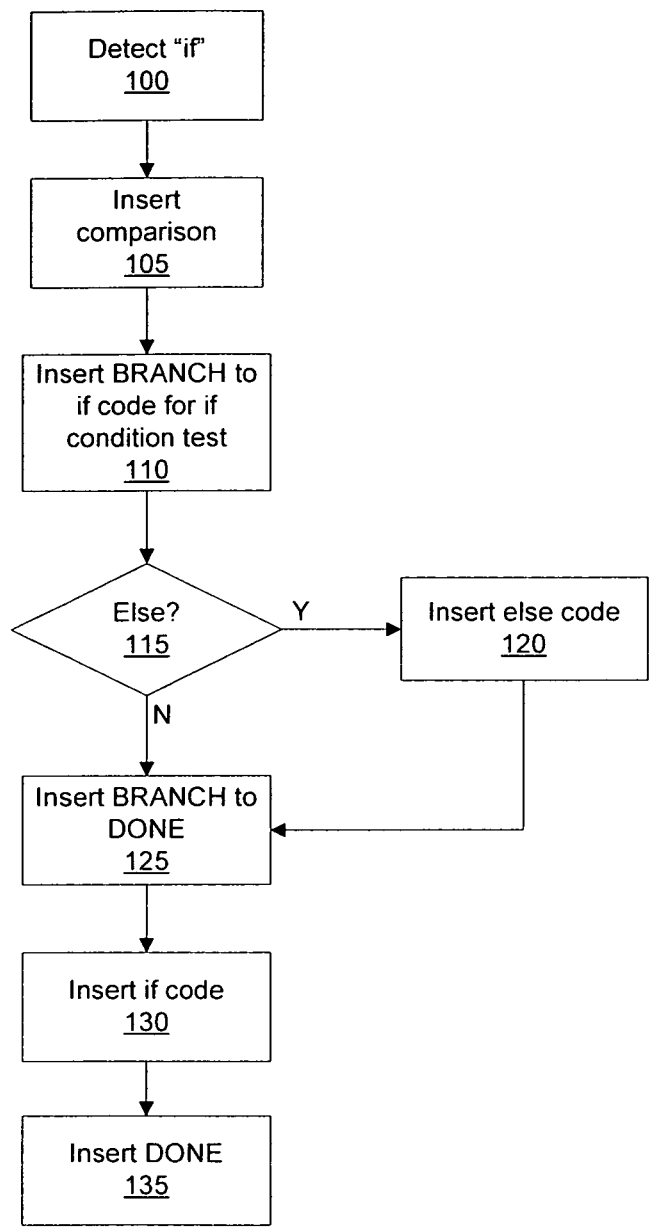
FIG. 1A illustrates a flow diagram of an exemplary method of compiling if-then statements for non-numeric values in accordance with one or more aspects of the present invention.

FIG. 1A illustrates a flow diagram of an exemplary method of compiling if-then statements for non-numeric values in accordance with one or more aspects of the present invention. In step 100 an "if" statement is detected by a compiler. In step 105 the compiler inserts a comparison operation representing the "if" statement condition. When compiling "if A>B X=0" the compiler inserts "COMP cc, A, B" to write the condition code, cc, with the result of A-B. An exemplary code sequence produced by the compiler for "if A>B X=0" is shown in TABLE 2.

In step 110 the compiler inserts a branch command to branch to the if code, i.e., command(s) immediately following the if statement, when the if condition is true. For example, the compiler inserts "BRANCH cc.GT AGTB," where AGTB is the command X=0. Note that when either A or B is a NaN, the branch to AGTB will not be taken. In step 115 the compiler determines if an "else" statement is paired with the "if" statement, and, if not, the compiler proceeds to step 125. In step 125 the compiler inserts a second branch command, e.g., "BRANCH cc.TR DONE," to branch over the if code (AGTB, in the example) in order to not execute the if code when the if condition is false. Using a condition test of LE (less than or equal to) instead of TR (true) for the second branch may result in a condition code with a NaN value incorrectly executing the if code. When the if condition is not true or is NaN, the if code should not be executed. The second branch command using a condition test of TR ensures that the code will produce the desired result. In order to produce a proper result when a NaN value is present, the second BRANCH is used in the code sequence shown in TABLE 2. In contrast, the code sequence shown in TABLE 1 does not include the second BRANCH and does not produce the proper result when a NaN value is present.

In step 130 the compiler inserts the if code, e.g., X=0. Although only one command is shown in the example, the if code may include more than one command and each command is inserted in the code. In step 135 the compiler inserts the second branch destination, DONE.

TABLE 2

COMP cc, A, B
BRANCH cc.GT AGTB
BRANCH cc.TR DONE
AGTB: X=0
DONE:

If, in step 115 the compiler determines that an "else" statement is paired with the "if" statement, then in step 120 the compiler inserts the else code, i.e., command(s) immediately following the "else" statement that should be executed when the if condition is false, before continuing to step 125. An exemplary code sequence produced by the compiler for "if A>B X=0; else result=X;" is shown in TABLE 3.

TABLE 3

COMP cc, A, B
BRANCH cc.GT AGTB
result = X
BRANCH cc.TR DONE
AGTB: X=0
DONE:

Although, the code generated by the compiler using the method shown in FIG. 1A produces deterministic results for NaN values, more efficient code may be generated using explicit NaN condition tests. In particular, the execution of each branch command may increase the execution time in a multi-threaded processor since a first group of threads that don't execute the branch may be idle while a second group of threads that do execute the branch are processed. Additionally, for an if-else pair, the first group of threads are processed while the second group of threads are idle, potentially reducing the processing throughput by half. Therefore, reducing the number of branch commands may improve processing throughput when the generated code is executed by a multi-threaded processor.

Figure 1B:
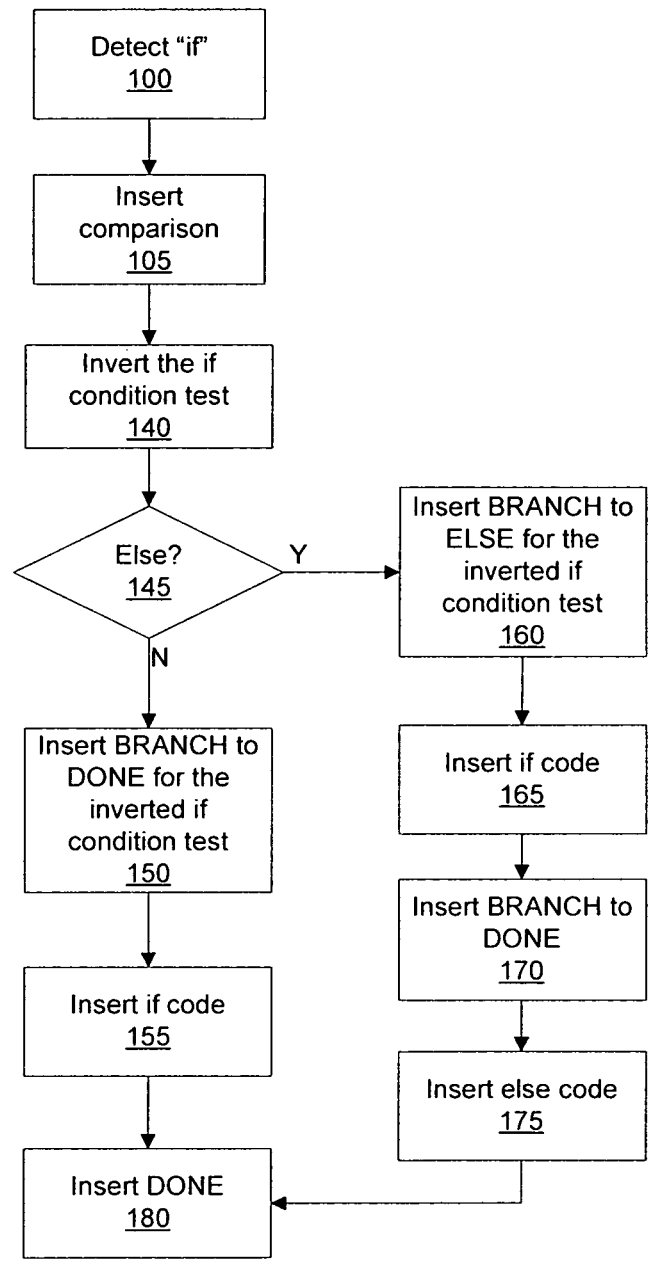
FIG. 1B illustrates a flow diagram of another exemplary method of compiling if-then statements for non-numeric values in accordance with one or more aspects of the present invention.

FIG. 1B illustrates a flow diagram of another exemplary method of compiling if-then statements for non-numeric values in accordance with one or more aspects of the present invention. The method shown in FIG. 1B produces fewer branch commands than the method shown FIG. 1A, while still producing code sequences that yield deterministic results in the presence of non-numeric values. Specifically, the method shown in FIG. 1B produces the code sequences shown in TABLES 5 and 6, corresponding to the code sequences shown in TABLES 2 and 3, respectively.

Steps 100 and 105 are performed as previously described in conjunction with FIG. 1A. In step 140 the compiler inverts the if condition test to produce an inverted condition test. TABLE 4 shows the inverted condition test that corresponds to each test representing an if condition.

TABLE 4

| If condition test | Inverted condition test |
|---|---|
| GT | LEU |
| LT | GEU |
| LE | GTU |
| GE | LTU |
| EQ | NEU |
| NE | EQU |
| LEG | U |
| U | LEG |
| LTU | GE |
| EQU | NE |

TABLE 4-continued

| If condition test | Inverted condition test |
|---|---|
| LEU | GT |
| GTU | LE |
| NEU | EQ |
| GEU | LT |

Six of the condition tests, e.g., GT, LT, GE, LE, EQ, and NE, are the conventional condition tests. Eight new condition tests, e.g., LEG, U, LTU, EQU, LEU, GTU, NEU, and GEU, provide for explicit handling of NaN values. LEG (less than, equal, or greater than) is only true when the condition code value is zero, positive, or negative, i.e., ordered. U (unordered) is only true when the condition code value is unordered, i.e., NaN. LTU (less than zero or unordered) is true when the condition code value is negative or NaN. EQU (equal to zero or unordered) is only true when the condition code value is zero or NaN. LEU (less than or equal to zero or unordered) is only true when the condition code value is negative, zero, or NaN. GTU (greater than zero or unordered) is only true when the condition code value is positive or NaN. NEU (not equal to zero or unordered) is only true when the condition code value is positive, negative, or NaN. GEU (greater than or equal to zero or unordered) is only true when the condition code value is positive, zero, or NaN.

In step 145 the compiler determines if an "else" statement is paired with the "if" statement, and, if not, the compiler proceeds to step 150. In step 150 the compiler inserts a branch command, e.g., "BRANCH inverted condition test DONE," to branch over the if code in order to not execute the if code when the if condition is false. In step 155 the compiler inserts the if code, e.g., X=0. Although only one command is shown in the example, the if code may include more than one command and each command is inserted in the code. In step 180 the compiler inserts the branch destination, DONE.

An exemplary code sequence produced by the compiler for "if A>B X=0" is shown in TABLE 5. When the if condition test is GT, corresponding to the A>B comparison, the inverted condition test is LEU. Therefore, the branch will be taken when A<B or when either A or B is a NaN and the if code will not be executed. The branch command ensures that the code will produce the desired result when a non-numeric value is present.

TABLE 5

COMP cc, A, B
BRANCH cc.LEU DONE
X=0
DONE:

The code shown in TABLE 5 has one less branch command compared with the code shown in TABLE 2, and therefore, may result in improved processing throughput when executed by a multi-threaded processor.

If, in step 145 the compiler determines that an "else" statement is paired with the "if" statement, then in step 160 the compiler inserts a branch command, e.g., "BRANCH inverted condition test ELSE," to branch to the else code in order to not execute the if code. In step 165 the compiler inserts the if code, e.g., X=0. In step 170 the compiler inserts a second branch command, e.g., "BRANCH cc.TR DONE," to branch to the end of the code sequence, jumping over the else code. In step 170 the compiler inserts the else code, i.e., command(s) immediately following the "else" statement, that should be executed when the if condition is false, before continuing to step 180. An exemplary code sequence produced by the compiler for "if A>B X=0; else result=X;" is shown in TABLE 6.

TABLE 6

COMP cc, A, B
BRANCH cc.LEU ELSE
X=0
BRANCH cc.TR DONE
ELSE: result=X
DONE:

When the compiler generates code using explicit condition tests, such as the code shown in TABLES 5 and 6, fewer branch commands may be needed to produce deterministic results in the presence of non-numeric values compared with using conventional condition tests as shown in TABLES 2 and 3, respectively.

In some embodiments of the present invention, a condition test may be used in a predicated command. A predicated command combines the condition test of an if statement into the command, rather than using a branch command. For example, MUL C(cc.GT), D, E computes C as the produce of D and E when the condition code value is true for the condition test GT. An exemplary code sequence produced by the compiler using the new condition tests (that explicitly handle NaNs) and predicated commands for "if A>B C=D*E; else C=F+G;" is shown in TABLE 7.

TABLE 7

COMP cc, A, B
MUL C(cc.GT) D, E
ADD C(cc.LEU) F,G

When the condition code value is NaN, the multiply command (MUL) will not be executed and the addition command (ADD) will be executed. When the new condition test, LEU, is replaced with a conventional condition test, LE, neither the multiple nor the addition command are executed when the condition code value is NaN and C remaining undefined, producing an undesirable result.

Figure 1C:
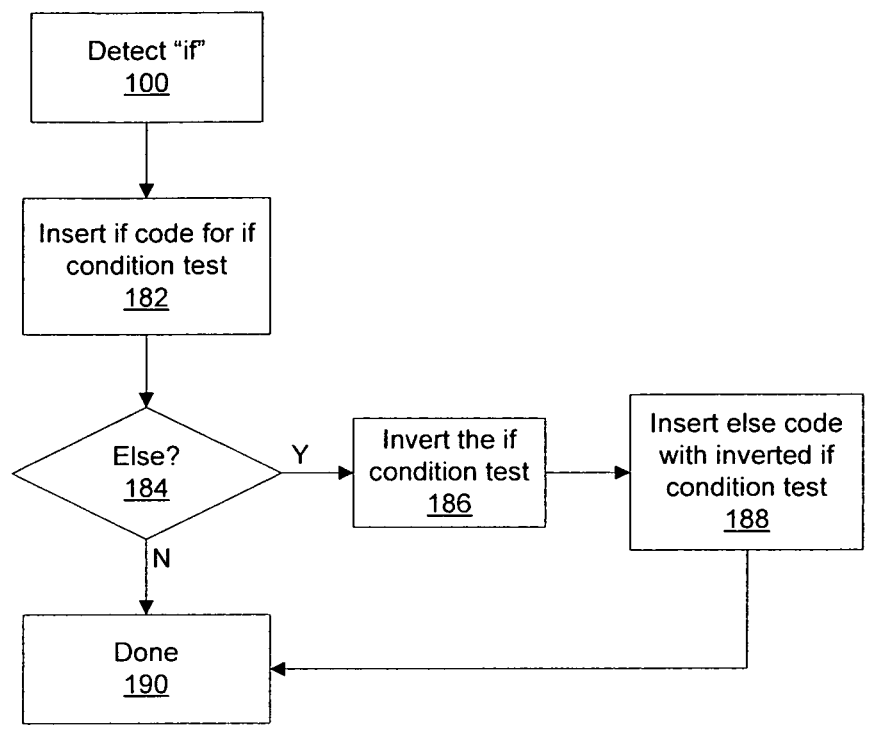
FIG. 1C illustrates a flow diagram of an exemplary method of compiling if-then statements for non-numeric values using predicated commands in accordance with one or more aspects of the present invention.

FIG. 1C illustrates a flow diagram of an exemplary method of compiling if-then statements for non-numeric values using predicated commands in accordance with one or more aspects of the present invention. In step 100 an "if" statement is detected by a compiler. In step 105 the compiler inserts a comparison operation representing the "if" statement condition. In step 182 the compiler inserts the if code as a predicated command based on the test corresponding to the if condition. In step 184 the compiler determines if an "else" statement is paired with the "if" statement, and, if not, the compiler proceeds to step 190 and the command sequence is complete. If, in step 184 the compiler determines if an "else" statement is paired with the "if" statement, then in step 186 the compiler inverts the if condition test to produce an inverted condition test. In step 188 the compiler inserts the else code as a predicated command based on the inverted condition test in order to execute the else code when the if condition is false. Using predicated commands with the new condition tests eliminates the generation of branches for if and if-else statements, thereby improving command processing throughput.

Figure 2:
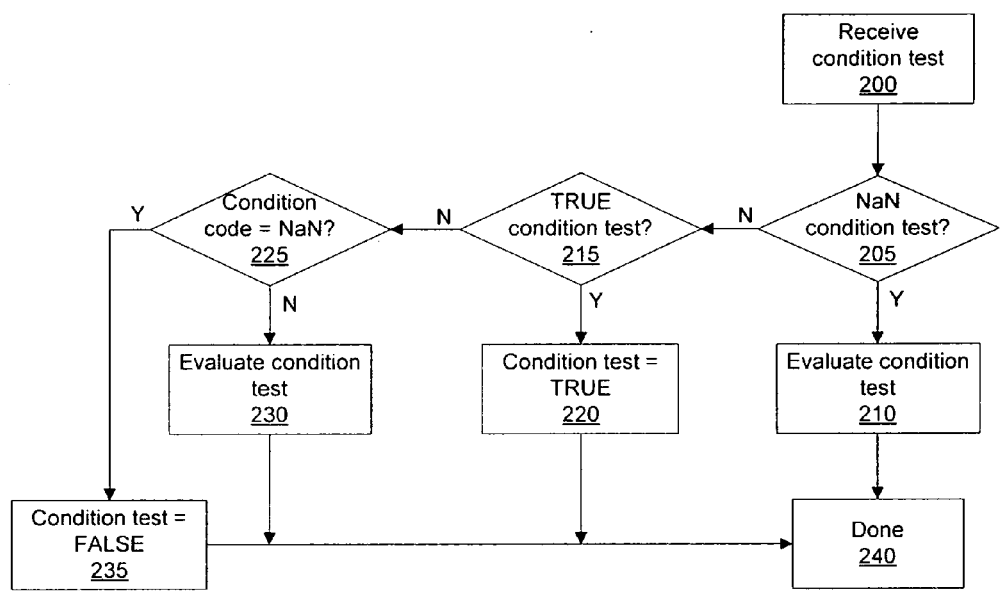
FIG. 2 illustrates a flow diagram of an exemplary method of executing code compiled with explicit unordered condition tests in accordance with one or more aspects of the present invention.

FIG. 2 illustrates a flow diagram of an exemplary method of executing code compiled with explicit unordered condition tests, in accordance with one or more aspects of the present invention. The method shown in FIG. 2 may be used to execute the code shown in TABLES 1, 2, 3, 5, 6, or 7. In step 200 an instruction processing unit receives a command with a condition test, such as a branch command or predicated command. As previously described, a condition code is written based on a comparison between two values. The same instruction processing unit may execute a command to write the condition code indicating the comparison result as positive, negative, zero, or NaN.

In step 205 the instruction processing unit determines if the condition test explicitly handles NaN condition code values, and, if so, in step 210 the instruction processing unit evaluates the condition test. NaN condition tests include GTU, GEU, LEU, LTU, LEG, U, EQU, and NEU. If, in step 205, the instruction processing unit determines that the condition test does not explicitly handle NaN condition codes, i.e., the condition test is a conventional condition test, then in step 215 the instruction processing unit determines if the condition test is TR. If, in step 215 the instruction processing unit determines that the condition test is TR, then in step 220 the test is evaluated to produce a result of true. Otherwise, in step 225 the instruction processing unit determines if the condition code value is NaN, and, if so, in step 235 the test is evaluated to produce a result of false.

If, in step 225 the instruction processing unit determines that the condition code value is not NaN, then in step 230 the test is evaluated to produce a result of true or false based on the condition code value of positive, negative, or zero. In step 240 execution of the condition test is complete and the instruction processing unit may proceed with execution of the command including the condition test. Persons skilled in the art will appreciate that any system configured to perform the method steps of FIG. 1A, 1B, 1C, or 2, or their equivalents, is within the scope of the present invention.

Figure 3:
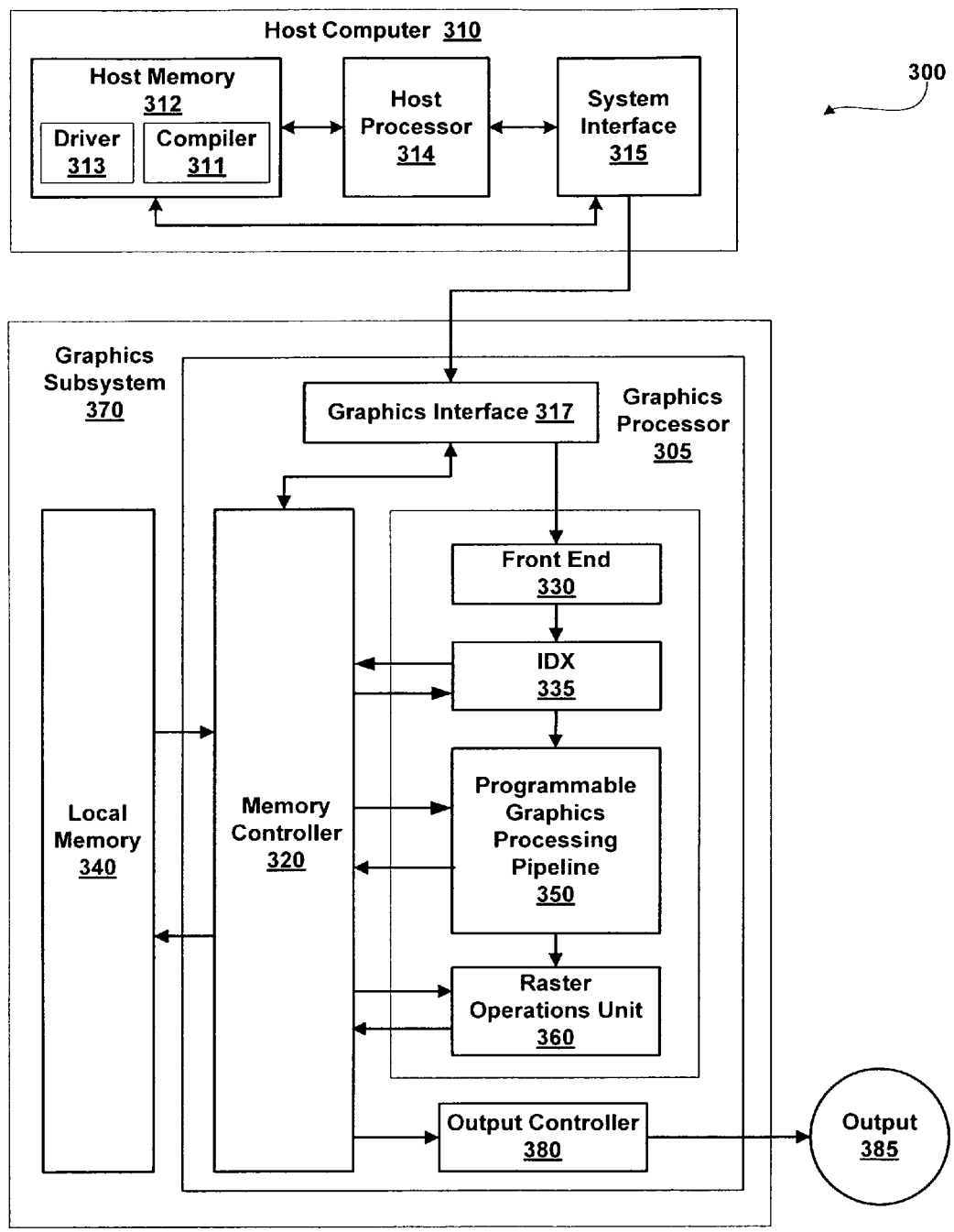
FIG. 3 illustrates a computing system including a host computer and a graphics subsystem in accordance with one or more aspects of the present invention.

FIG. 3 illustrates a computing system generally designated 300 including a host computer 310 and a graphics subsystem 370 in accordance with one or more aspects of the present invention. Computing system 300 may be a desktop computer, server, laptop computer, personal digital assistant (PDA), palm-sized computer, tablet computer, game console, cellular telephone, computer based simulator, or the like. Host computer 310 includes host processor 314 that may include a system memory controller to interface directly to host memory 312 or may communicate with host memory 312 through a system interface 315. System interface 315 may be an I/O (input/output) interface or a bridge device including the system memory controller to interface directly to host memory 312. Examples of system interface 315 known in the art include Intel® Northbridge.

A compiler 311 compiles programs to generate commands for execution by graphics subsystem 370. Compiler 311 may determine if predicated commands and/or NaN condition tests are supported by graphics subsystem 370 and generate branch or predicated commands using NaN condition tests to improve processing throughput when the code is executed. Although graphic subsystem 370 is a specialized processing system for graphics data, compiler 311 may be configured to generate commands for execution on other types of specialized processors or for host processor 314.

A graphics device driver, driver 313, interfaces between processes executed by host processor 314, such as application programs, and a programmable graphics processor 305, translating program commands produced by compiler 311 as needed for execution by graphics processor 305. Driver 313 also uses commands to configure sub-units within graphics processor 305.

Host computer 310 communicates with graphics subsystem 370 via system interface 315 and a graphics interface 317 within a graphics processor 305. Data received at graphics interface 317 can be passed to a front end 330 or written to a local memory 340 through memory controller 320. Graphics processor 305 uses graphics memory to store graphics data and program commands, where graphics data is any data that is input to or output from components within the graphics processor. Graphics memory can include portions of host memory 312, local memory 340, register files coupled to the components within graphics processor 305, and the like.

Graphics processor 305 includes, among other components, front end 330 that receives commands from host computer 310 via graphics interface 317. Front end 330 interprets and formats the commands and outputs the formatted commands and data to an IDX (Index Processor) 335. Some of the formatted commands are used by programmable graphics processing pipeline 350 to initiate processing of data by providing the location of program commands or graphics data stored in memory. IDX 335, programmable graphics processing pipeline 350 and a raster operations unit 360 each include an interface to memory controller 320 through which program commands and data can be read from memory, e.g., any combination of local memory 340 and host memory 312.

IDX 335 optionally reads processed data, e.g., data written by raster operations unit 360, from memory and outputs the data, processed data and formatted commands to programmable graphics processing pipeline 350. Programmable graphics processing pipeline 350 and raster operations unit 360 each contain one or more programmable processing units to perform a variety of specialized functions. Some of these functions are table lookup, scalar and vector addition, multiplication, division, coordinate-system mapping, calculation of vector normals, tessellation, calculation of derivatives, interpolation, and the like. Programmable graphics processing pipeline 350 and raster operations unit 360 are each optionally configured such that data processing operations are performed in multiple passes through those units or in multiple passes within programmable graphics processing pipeline 350. Programmable graphics processing pipeline 350 and raster operations unit 360 also each include a write interface to memory controller 320 through which data can be written to memory.

In a typical implementation, programmable graphics processing pipeline 350 performs geometry computations, rasterization, and pixel computations. Therefore, programmable graphics processing pipeline 350 is programmed to operate on surface, primitive, vertex, fragment, pixel, sample or any other data. For simplicity, the remainder of this description will use the term "samples" to refer to graphics data such as surfaces, primitives, vertices, pixels, fragments, or the like.

Samples output by programmable graphics processing pipeline 350 are passed to raster operations unit 360, which optionally performs near and far plane clipping and raster operations, such as stencil, z test, and the like, and saves the results or the samples output by programmable graphics processing pipeline 350 in local memory 340. When the data received by graphics subsystem 370 has been completely processed by graphics processor 305, an output 385 of graphics subsystem 370 is provided using an output controller 380. Output controller 380 is optionally configured to deliver data to a display device, network, electronic control system, other computing system 300, other graphics subsystem 370, or the like. Alternatively, data is output to a film recording device or written to a peripheral device, e.g., disk drive, tape, compact disk, or the like.

Figure 4:
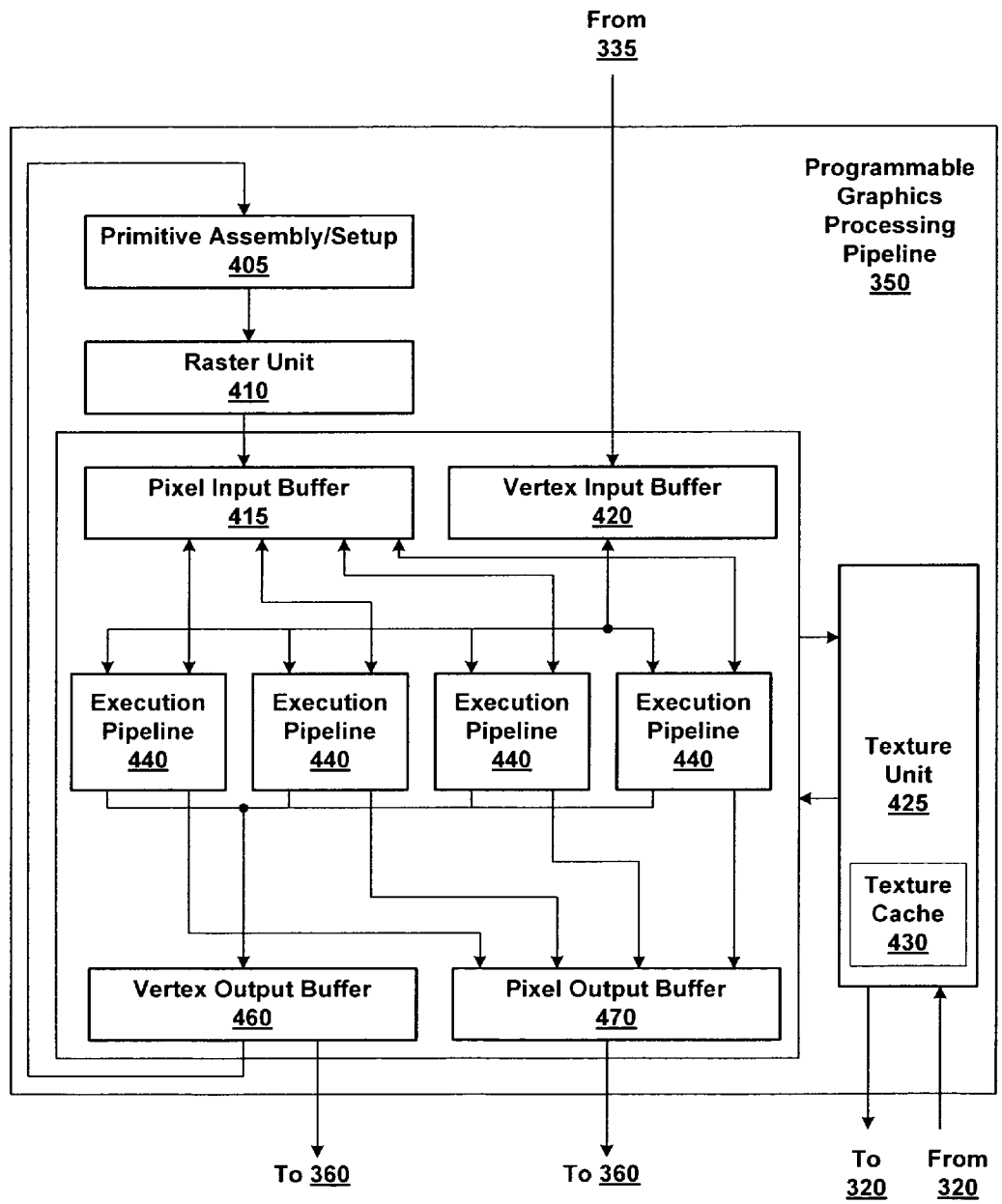
FIG. 4 illustrates the programmable graphics processing pipeline of FIG. 3 in accordance with one or more aspects of the present invention.

FIG. 4 illustrates programmable graphics processing pipeline 350 of FIG. 3 in accordance with one or more aspects of the present invention. At least one set of samples is output by IDX 335 and received by programmable graphics processing pipeline 350 and the at least one set of samples is processed according to at least one program, the at least one program including graphics program commands. A program can process one or more sets of samples. Conversely, a set of samples can be processed by a sequence of one or more programs.

Samples, such as surfaces, primitives, or the like, are received from IDX 335 by programmable graphics processing pipeline 350 and stored in a vertex input buffer 420 including a register file, FIFO (first in first out), cache, or the like (not shown). The samples are broadcast to execution pipelines 440, four of which are shown in FIG. 4. Each execution pipeline 440 includes at least one multi-threaded processing unit, to be described further herein. The samples output by vertex input buffer 420 can be processed by any one of the execution pipelines 440. A sample is accepted by an execution pipeline 440 when a processing thread within the execution pipeline 440 is available to process the sample. Each execution pipeline 440 signals to vertex input buffer 420 when a sample can be accepted or when a sample cannot be accepted. In one embodiment of the present invention, programmable graphics processing pipeline 350 includes a single execution pipeline 440 containing one multi-threaded processing unit. In other embodiments of the present invention, programmable graphics processing pipeline 350 includes a plurality of execution pipelines 440.

Execution pipelines 440 may receive first samples, such as higher-order surface data, and tessellate the first samples to generate second samples, such as vertices. Execution pipelines 440 may be configured to transform the second samples from an object-based coordinate representation (object space) to an alternatively based coordinate system such as world space or normalized device coordinates (NDC) space. Each execution pipeline 440 may communicate with texture unit 425 using a read interface (not shown in FIG. 4) to read program commands, spilled stack data, and graphics data such as texture maps from local memory 340 or host memory 312 via memory controller 320 and a texture cache 430. Texture cache 430 is used to improve memory read performance by reducing read latency. In one embodiment of the present invention, texture cache 430 is omitted. In another embodiment of the present invention, a texture unit 425 is included in each execution pipeline 440. Alternatively, each execution pipeline 440 has a dedicated command read interface to read program commands from local memory 340 or host memory 312 via memory controller 320.

Execution pipelines 440 output processed samples, such as vertices, that are stored in a vertex output buffer 460 including a register file, FIFO, cache, or the like (not shown). Processed vertices output by vertex output buffer 460 are received by a primitive assembly/setup unit 405. Primitive assembly/setup unit 405 calculates parameters, such as deltas and slopes, to rasterize the processed vertices and outputs parameters and samples, such as vertices, to a raster unit 410. Raster unit 410 performs scan conversion on samples, such as vertices, and outputs samples, such as fragments, to a pixel input buffer 415. Alternatively, raster unit 410 resamples processed vertices and outputs additional vertices to pixel input buffer 415.

Pixel input buffer 415 outputs the samples to each execution pipeline 440. Samples, such as pixels and fragments, output by pixel input buffer 415 are each processed by only one of the execution pipelines 440. Pixel input buffer 415 determines which one of the execution pipelines 440 to output each sample to depending on an output pixel position, e.g., (x,y), associated with each sample. In this manner, each sample is output to the execution pipeline 440 designated to process samples associated with the output pixel position. In an alternate embodiment of the present invention, each sample output by pixel input buffer 415 is processed by one of any available execution pipelines 440.

Each execution pipeline 440 signals to pixel input buffer 415 when a sample can be accepted or when a sample cannot be accepted. Program commands configure programmable computation units (PCUs) within an execution pipeline 440 to perform operations such as tessellation, perspective correction, texture mapping, shading, blending, and the like. Processed samples are output from each execution pipeline 440 to a pixel output buffer 470. Pixel output buffer 470 optionally stores the processed samples in a register file, FIFO, cache, or the like (not shown). The processed samples are output from pixel output buffer 470 to raster operations unit 360.

Figure 5:
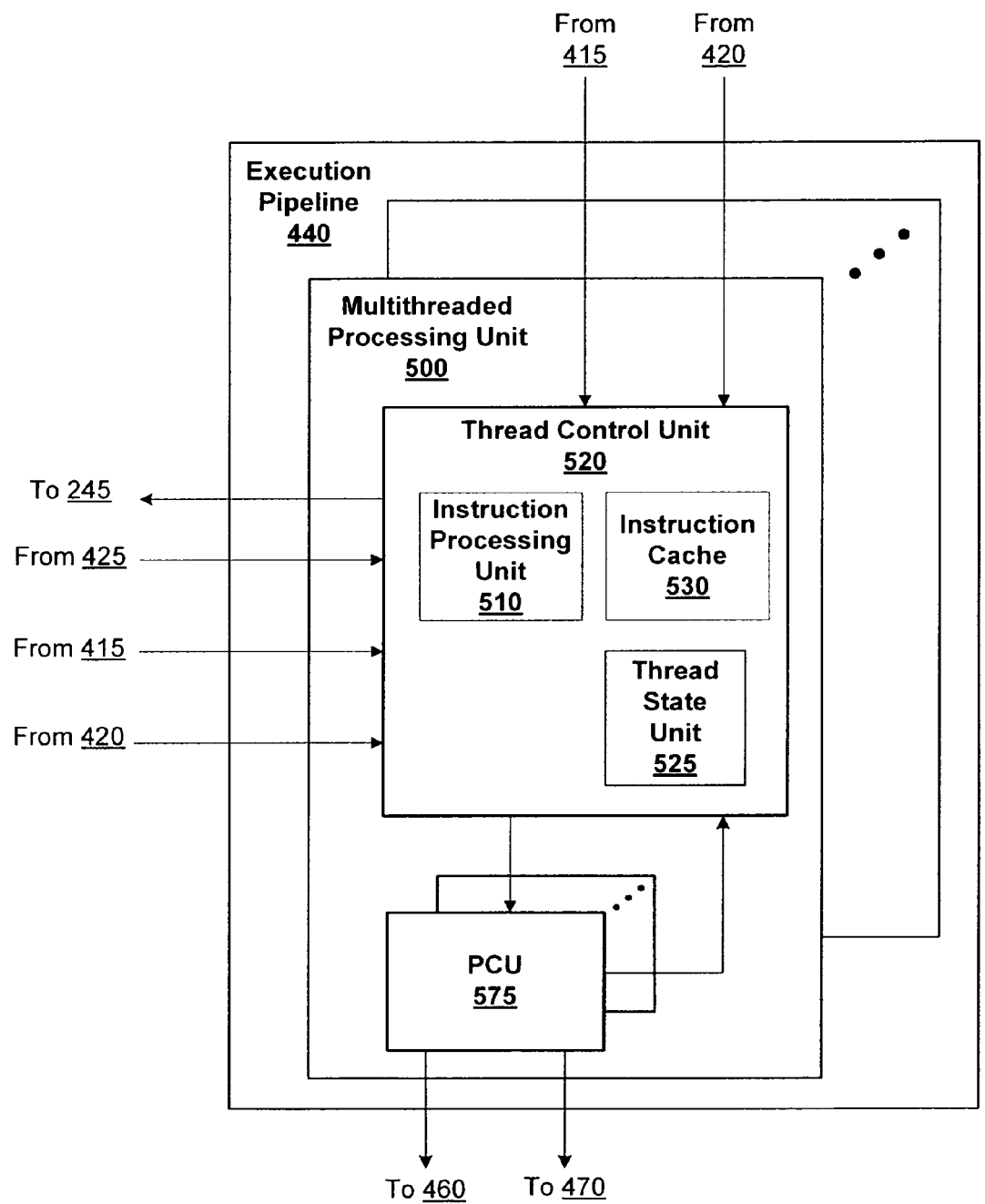
FIG. 5 illustrates the execution pipeline of FIG. 4 in accordance with one or more aspects of the present invention.

FIG. 5 illustrates execution pipeline 440 of FIG. 4, including at least one multithreaded processing unit 500, in accordance with one or more aspects of the present invention. An execution pipeline 440 can contain a plurality of multi-threaded processing units 500, with each multithreaded processing unit 500 containing at least one PCU 575. PCUs 575 are configured using program commands read by a thread control unit 520 via texture unit 425. Thread control unit 520 gathers source data specified by the program commands and dispatches the source data and program commands to at least one PCU 575. PCUs 575 perform computations specified by the program commands and output data to at least one destination, e.g., pixel output buffer 360, vertex output buffer 460 and thread control unit 520.

One characteristic of the system disclosed in FIGS. 5, 4, and 5 is that it may be configured to embody a SIMD (single instruction multiple data) architecture, where a thread is assigned to each sample processed in the one or more execution pipelines 440. Therefore, a single program may be used to process several sets of samples. Thread control unit 520 receives samples or pointers to samples stored in pixel input buffer 415 and vertex input buffer 420. Thread control unit 520 receives a pointer to a program, i.e., sequence of commands generated by compiler 311, to process one or more of the samples.

In one embodiment of the present invention, thread control unit 520 assigns a thread (threadID) to each sample to be processed. A thread includes a pointer to a program command (program counter), such as the first command within the program, thread state information, and storage resources for storing intermediate data generated when processing the sample. In other embodiments of the present invention, rather than assigning a different threadID to each thread, thread control unit 520 assigns a threadID to several threads that are processed as a group. However, there are points in a program (i.e., branches) where threads in a thread group are allowed to "diverge" from one another so that one or more threads may execute commands on their respective samples that do not need to be executed by the other threads in the thread group. Divergent threads in a thread group may be synchronized at various points in the program to guarantee that some level of synchronized processing may be achieved at those points. Once all of the threads in the thread group are synchronized, the threads resume execution in lock-step, i.e. each sample is processed by the same sequence of commands in a SIMD manner.

When operating in a synchronized mode, each thread being processed by a particular multi-threaded processing unit 500 independently executes the same operations (or commands) on its respective sample. This type of synchronized processing is advantageous because, among other things, it allows groups of like samples to be processed simultaneously, which increases graphics processing efficiency. As previously described when branches are executed, command processing throughput may decrease since some of the threads in the thread group may diverge with a portion of the threads in the thread group taking the branch while the remaining thread in the thread group are idle. It is desirable to minimize the number of branch commands to allow all of the threads to be processed each clock cycle. The number of branches may be minimized by using NaN condition tests and predicated commands.

Instruction processing unit 510 uses the program counter for each thread to read program commands from instruction cache 530 to execute the thread. When a requested program command is not available in instruction cache 530 it is read (possibly along with other program commands stored in adjacent memory locations) from graphics memory via texture unit 425. A base address, corresponding to the graphics memory location where a first command in a program is stored, may be used in conjunction with a program counter to determine the location in graphics memory where a program command corresponding to the program counter is stored. In an alternate embodiment of the present invention, instruction cache 530 can be shared between multithreaded processing units 500 within execution pipeline 440. Using predicated commands may improve the cache hit rate for instruction cache 530 compared with using branch commands since commands are executed in a linear sequence when predicated commands are used.

Instruction processing unit 510 receives the program commands from instruction cache 530 and executes branch commands and condition tests included in predicated commands. Instruction processing unit 510 evaluates comparisons to produce condition code values. Instruction processing unit 310 also evaluates the condition tests for predicated or branch commands using a method such as the one described in conjunction with FIG. 2. For execution of other commands (not branch commands) source data is gathered and the program command is output to one of the PCUs 575 for execution. The source data may be read from pixel input buffer 415, vertex input buffer 420, local memory 340, host memory 312, or the like. Processed samples are output to a destination specified by the command. The destination may be vertex output buffer 460, pixel output buffer 470, or registers within multithreaded processing unit 500. Alternatively, the destination may also include local memory 340, host memory 312, or the like.

In one embodiment, execution pipeline 440 may be configured to simultaneously process twenty-four independent thread groups. The different thread groups may be simultaneously processed in a MIMD (multiple instruction multiple data) manner relative to each other since each thread group may be processed by a different program or a different portion of the same program. In one embodiment, each thread group may include up to thirty-two threads. A particular multithreaded processing unit 500 within execution pipeline 440 may process one or more such thread groups.

Thread state information representing the current state of each thread being executed is stored in a thread state unit 525. Thread state unit 525 may be a register file, FIFO memory, circular buffer, or the like. Thread state unit 525 is configured to maintain an active mask and an active program counter for each of the thread groups processed by multithreaded processing unit 500. The active mask is a string of bits that indicates which threads in the thread group are currently active (i.e., currently executing commands). Each bit in the active mask corresponds to one thread in the thread group. When a branch command is executed the bits in the active mask are updated based on which threads are executing the branch and which threads are not executing the branch. In one embodiment, a bit is set if its corresponding thread is active. Thus, when all bits in the active mask are set, multithreaded processing unit 500 is operating in fully synchronized mode for execution of the thread group associated with the active mask. The active program counter indicates the address of the command in the program currently being executed by the active threads.

As the multithreaded processing unit processes commands in the program, it may encounter one or more branch commands. When a branch command is encountered, instruction processing unit 510 may push thread execution data onto a stack (not shown) that includes the current program counter. The thread execution data may also include state information related to various threads in the thread group, such as an active mask. After pushing the thread execution data onto the stack, instruction processing unit 510 may disable certain threads in the thread group, while keeping the other threads active. The active threads then execute the commands associated with the branch.

Minimizing branch commands by compiling a program using the new condition tests that explicitly account for NaN values and using predicated commands reduces the overhead for processing branch commands, i.e., saving and restoring thread state as threads within a group are disabled or enabled. The current invention involves new systems and methods for compiling programs using the condition codes with NaN values and NaN condition tests and executing those programs. The compiled programs including the NaN condition tests will generate deterministic results during execution when non-numeric values are present.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A computer-implemented method of generating a sequence of commands for explicit handling of non-numeric values, comprising:
    detecting an if statement including an if condition test and if code for execution when the if condition test is true;
    inserting, in the sequence of commands, a first comparison operation command that, when executed by a processing unit, compares a first source operand and a second source operand to produce a condition code value;
    selecting a first condition test from a set of condition tests based on the if condition test, wherein the set of condition tests includes at least one condition test that evaluates to true when at least one of the first source operand or the second source operand is not a number (NaN); and
    inserting a predicated arithmetic/logic command after the first comparison operation command, wherein the predicated arithmetic/logic command includes an arithmetic/logic operation, the first condition test, and the condition code value and deterministically executes or refrains from executing the arithmetic/logic operation based on the at least one condition test.

2. The method of claim 1, wherein the condition code value represents one of positive, negative, zero, and NaN.

3. The method of claim 2, wherein the at least one condition test comprises a LEG (less than, equal, or greater than) that evaluates to true only when the condition code value is zero, positive, or negative, U (unordered) that evaluates to true only when the condition code value is NaN, LTU (less than zero or unordered) that evaluates to true when the condition code value is negative or NaN, EQU (equal to zero or unordered) that evaluates to true only when the condition code value is zero or NaN, LEU (less than or equal to zero or unordered) that evaluates to true only when the condition code value is negative, zero, or NaN, GTU (greater than zero or unordered) that evaluates to true only the condition code value is positive or NaN, NEU (not equal to zero or unordered) that evaluates to true only when the condition code value is positive, negative, or NaN, or GEU (greater than or equal to zero or unordered) that evaluates to true only when the condition code value is positive, zero, or NaN.

4. The method of claim 1, further comprising detecting an else statement including else code for execution when the if condition test is not true.

5. The method of claim 4, further comprising:
determining an inverted if condition test that is evaluated as true when the if condition test is evaluated as not true; and
inserting a third command that is a predicated command including the inverted if condition test and the else code.

6. The method of claim 1, wherein the first condition test represents the inverted if condition test.

7. The computer-implemented method of claim 1, further comprising:
detecting an else statement that is paired with the if statement and that is associated with else code; and
configuring the branch command to target to the else code in response to detecting the else statement.

8. The computer-implemented method of claim 1, further comprising:
detecting that no else statement is paired with the if statement; and
configuring the branch command to target the if code in response to detecting that no else statement is paired with the if statement.

9. The computer-implemented method of claim 1, wherein the arithmetic/logic operation comprises a multiplication operation.

10. The computer-implemented method of claim 1, wherein the arithmetic/logic operation comprises an addition operation.

11. A system for processing commands with explicit handling of non-numeric values, comprising:
a memory storing a sequence of commands; and
a processor coupled to the memory, the processor comprising an instruction processing unit configured to:
execute a first comparison operation command included in the sequence of commands to compare a first source operand and a second source operand and produce a condition code value, wherein the first comparison operation is associated with an if condition test and if code for execution when the if condition test is true; and
execute a predicated arithmetic/logic command, comprising an arithmetic/logic operation, included in the sequence of commands after the first comparison operation command to evaluate a first condition test based on the condition code value, wherein the first condition test is based on the first comparison operation, wherein the first condition test evaluates to true when at least one of the first source operand or the second source operand is not a number (NaN), and wherein the predicated arithmetic/logic command deterministically executes or refrains from executing the arithmetic/logic operation based on the at least one condition test.

12. The system of claim 11, wherein the at least one condition test comprises a LEG (less than, equal, or greater than) that evaluates to true only when the condition code value is zero, positive, or negative, U (unordered) that evaluates to true only when the condition code value is NaN, LTU (less than zero or unordered) that evaluates to true when the condition code value is negative or NaN, EQU (equal to zero or unordered) that evaluates to true only when the condition code value is zero or NaN, LEU (less than or equal to zero or unordered) that evaluates to true only when the condition code value is negative, zero, or NaN, GTU (greater than zero or unordered) that evaluates to true only the condition code value is positive or NaN, NEU (not equal to zero or unordered) that evaluates to true only when the condition code value is positive, negative, or NaN, or GEU (greater than or equal to zero or unordered) that evaluates to true only when the condition code value is positive, zero, or NaN.

13. The system of claim 12, wherein the instruction processing unit is configured to execute a predicated command including the condition code value, the condition test, and an operation that is performed when the result is true.

14. The system of claim 12, wherein the instruction processing unit is configured to execute a branch command including a condition test and a destination that specifies a next command when the result is true.

15. A non-transitory computer readable medium storing instructions for causing a processor to generate commands for explicit handling of non-numeric values by performing the steps of:
detecting an if statement including an if condition test and if code for execution when the if condition test is true;
inserting, in the sequence of commands, a first comparison operation command that, when executed by the processor, compares a first source operand and a second source operand to produce a condition code value;
selecting a first condition test from a set of condition tests based on the if condition test, wherein the set of condition tests includes at least one condition test that evaluates to true when at least one of the first source operand or the second source operand is not a number (NaN); and
inserting a predicated arithmetic/logic command after the first comparison operation command, wherein the predicated arithmetic/logic command includes an arithmetic/logic operation, the first condition test, and the condition code value and deterministically executes or refrains from executing the arithmetic/logic operation based on the at least one condition test.

16. The computer readable medium of claim 15, wherein the condition code value represents one of positive, negative, zero, and NaN.

17. The computer readable medium of claim 16, wherein the at least one condition test comprises a of LEG (less than, equal, or greater than) that evaluates to true only when the condition code value is zero, positive, or negative, U (unordered) that evaluates to true only when the condition code value is NaN, LTU (less than zero or unordered) that evaluates to true when the condition code value is negative or NaN, EQU (equal to zero or unordered) that evaluates to true only when the condition code value is zero or NaN, LEU (less than or equal to zero or unordered) that evaluates to true only when the condition code value is negative, zero, or NaN, GTU (greater than zero or unordered) that evaluates to true only the condition code value is positive or NaN, NEU (not equal to zero or unordered) that evaluates to true only when the condition code value is positive, negative, or NaN, or GEU (greater than or equal to zero or unordered) that evaluates to true only when the condition code value is positive, zero, or NaN.

18. The computer readable medium of claim 15, wherein the first condition test represents the inverted if condition test.

\* \* \* \* \*

UNITED STATES PATENT AND TRADEMARK OFFICE
CERTIFICATE OF CORRECTION

PATENT NO. : 9,195,460 B1
APPLICATION NO. : 11/415781
DATED : November 24, 2015
INVENTOR(S) : Robert Steven Glanville, John Erik Lindholm and Ming Y. Siu Page 1 of 1

It is certified that error appears in the above-identified patent and that said Letters Patent is hereby corrected as shown below:

IN THE CLAIMS:

Column 14, Line 57, Claim 17, please delete "of".

Signed and Sealed this
Twenty-eighth Day of June, 2016

Michelle K. Lee
*Director of the United States Patent and Trademark Office*